Figure 1:
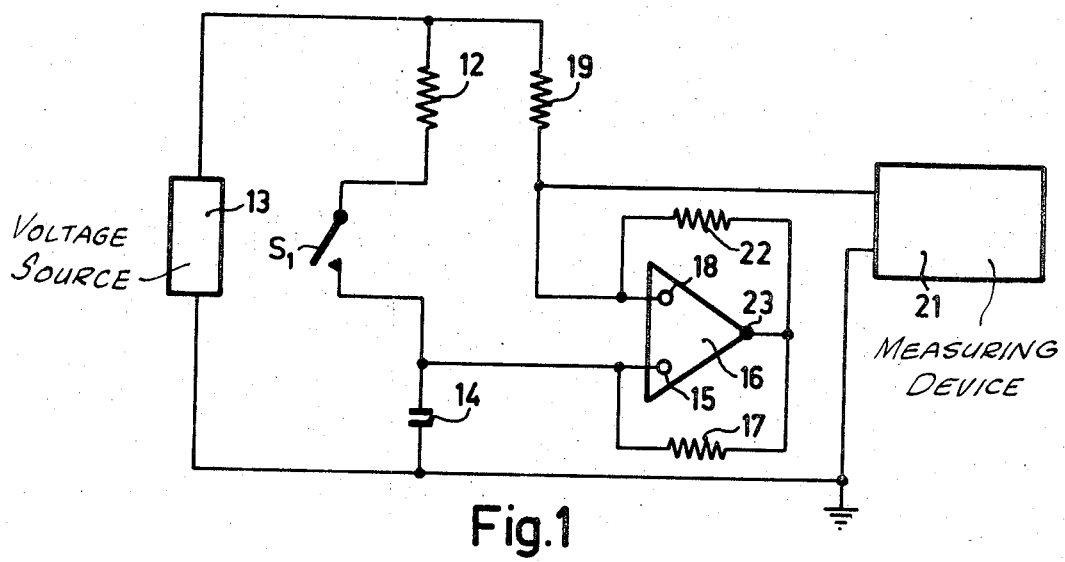

United States Patent [19]
Doittau et al.

[11] 3,790,890
[45] Feb. 5, 1974

[54] DEVICE FOR MEASURING A TIME INTERVAL

[75] Inventors: Francois-Xavier Doittau, Paris; Jean-Pierre Ythier, Maisons-Alfort; Marcel Herbert, Paris, all of France

[73] Assignee: U.S. Philips Corporation, New York, N.Y.

[22] Filed: Apr. 13, 1972

[21] Appl. No.: 243,564

[30] Foreign Application Priority Data
Apr. 20, 1971 France.............................. 7113938

[52] U.S. Cl. .............................................. 324/189
[51] Int. Cl. .............................................. G04f 9/00
[58] Field of Search............ 324/189, 78 E; 328/129

[56] References Cited
UNITED STATES PATENTS
2,269,603  1/1942  Rockwood........................ 324/189
3,296,581  1/1967  Warner........................ 324/189 UX

*Primary Examiner*—Alfred E. Smith
*Attorney, Agent, or Firm*—Frank R. Trifari

[57] ABSTRACT

Device for measuring a time interval which comprises a capacitor which is charged during a first time interval and is discharged during a second time interval and also comprises two resistors which are connected to the inputs of an operational amplifier and to the capacitor in a manner such that the ratio between the charge and the discharge times is proportional to the ratio between the values of the resistors. By making this resistance ratio one to ten thousand short time intervals in the nanosecond range may be converted into time intervals which lie in the microsecond or millisecond range and hence can be measured with a higher degree of accuracy.

10 Claims, 5 Drawing Figures

3,790,890

DEVICE FOR MEASURING A TIME INTERVAL

The present invention relates to a device for measuring a time interval. It relates more particularly to a device for measuring a time interval which comprises a capacitor, charging means which are connected to the capacitor and supply charge during a first time interval which depends upon the time interval to be measured, discharging means which conduct the charge away from the capacitor during a second time interval which is related to the first time interval, and means for measuring the second time interval. Such devices enable every short time intervals to be measured by causing a proportional prolongation thereof which is based on the following principle: a capacitor is charged during a time which is proportional to the time to be measured and then is discharged during a far longer time which is in a known ratio to the time to be measured.

Such known devices may comprise, for example, a capacitor which is connected through a switch to a first current generator and also to a second current generator and a measuring device. The second generator causes a current $i$ to flow which originates from the capacitor and flows to the generator and the value of which is much smaller than that of the current $I$ which delivered by the first generator and flows from this first current generator to the capacitor with the switch closed. The switch is in the closed condition during a time $t_1$ to be measured, the first generator linearly charging the capacitor with a constant current which is equal to $I - i$ and hence is substantially equal to $I$. When the time $t_1$ has elapsed, the switch is opened and the capacitor discharges linearly, the discharge current being equal to $i$. The discharge time $t_2$ is proportional to the charge time $t_1$ in the ratio $I/i$. Then the time $t_2$ is measured by means of a time measuring device, for example, by counting the number of pulses from a high-frequency pulse source by means of a counter. This enables the time $t_1$ to be deduced because the ratio $I/i$ is known.

Such a device has many disadvantages the most important of which are:

It is very difficult to manufacture current generators which deliver a very small current, as $i$ is, and still have sufficient stability, from commercially available circuit elements.

Also, because the discharge characteristic for a linear discharge has a very low gradient, the transition to a given voltage threshold across the capacitor cannot accurately be determined.

The device according to the invention enables these disadvantages to be avoided.

It is an object of the invention to obtain a ratio between the charge and discharge times of the capacitor which is simple, stable and accurate. It is another object of the invention to provide a discharge curve of the capacitor which will enable the transition to a given voltage threshold across the said capacitor to be accurately measured, i.e. such that the transition of the voltage to this threshold value is rapid. For this purpose the device according to the invention is arranged so that the ratio between the charge and discharge times of the capacitor is equal to the ratio between two resistors.

According to the invention a time interval measuring device of the type mentioned at the beginning of this specification is characterized in that the charging means include a first resistor which is connected to a voltage source during the first time interval and the discharging means include an operational amplifier the first input terminal of which is connected to the capacitor and the second input terminal of which is connected via a second resistor to the said voltage source. A third resistor is connected between the output and the said first input terminal and a fourth resistor is connected between the output and the said second input terminal of the operational amplifier. The means for measuring the second time interval includes a voltage comparator one input of which is connected to the said second input terminal and the othe input of which is connected to the reference line to which the voltage source and the capacitor are also connected. According to the arrangement, the ratio between the first and second time intervals is proportional to the ratio between the values of the fourth and third resistors.

In one embodiment the voltage source is a pulse having a duration to be measured and a variable amplitude which is stored in a storage device.

Figure 2:
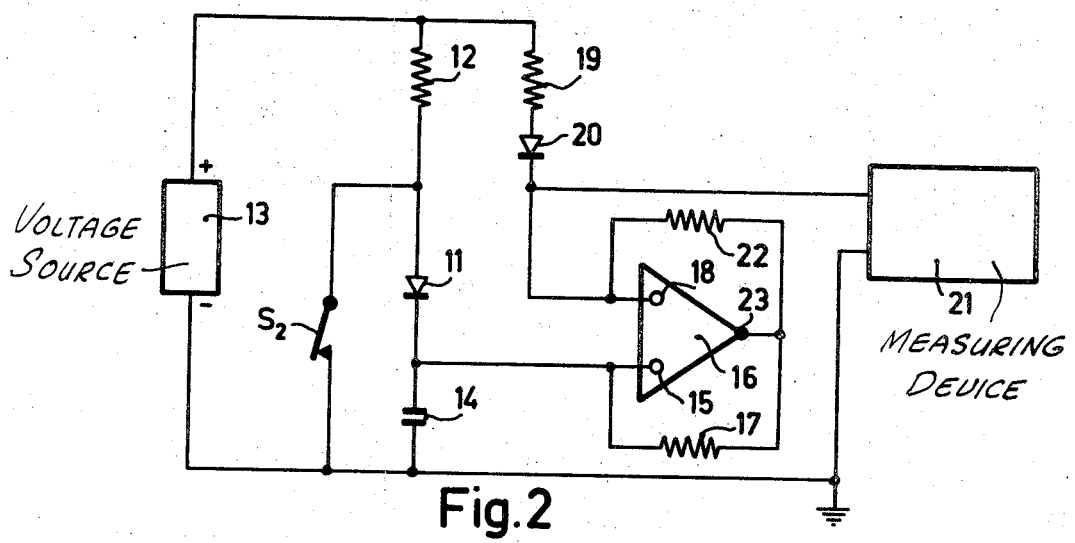
Figure 3:
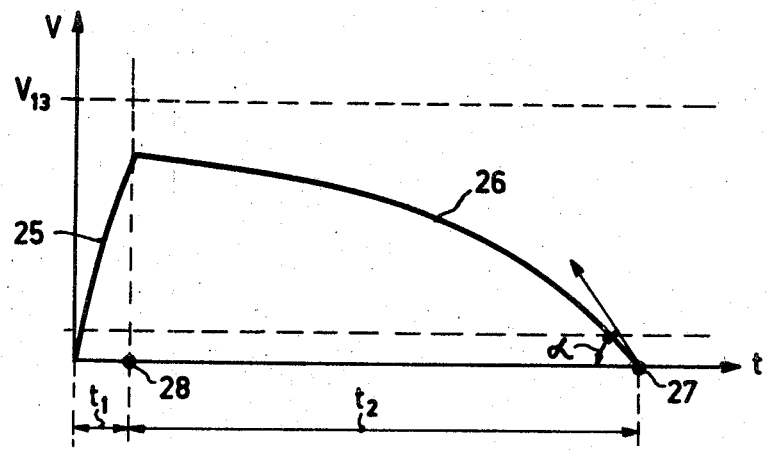
Figure 4:
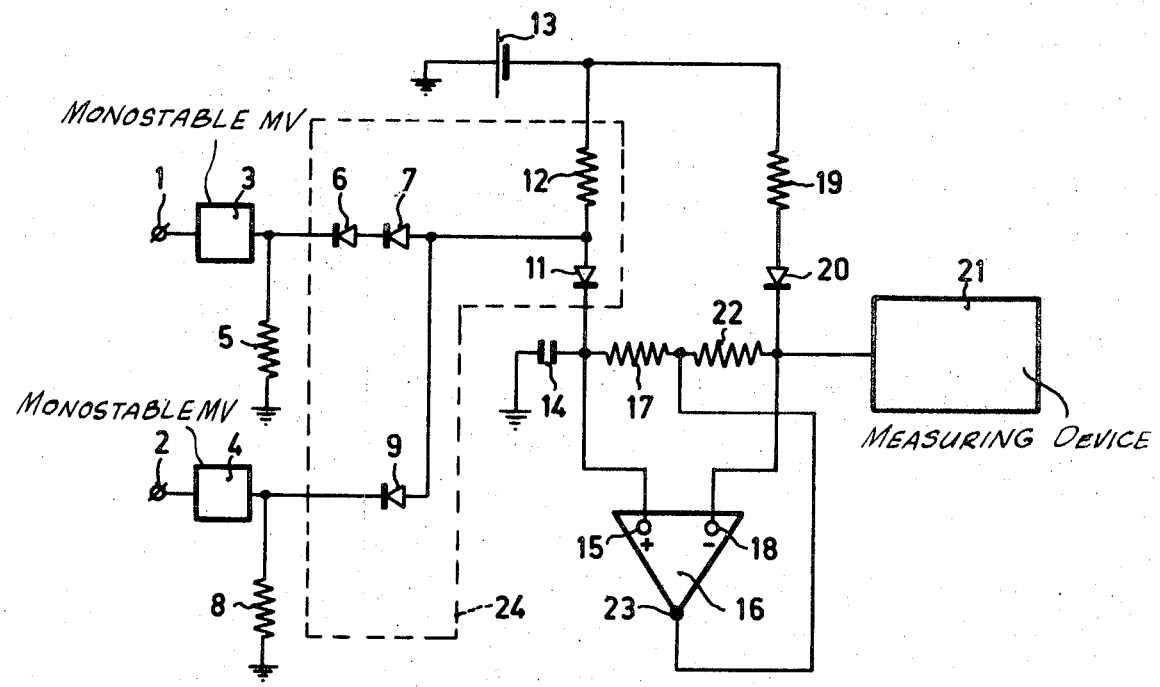
Figure 5:
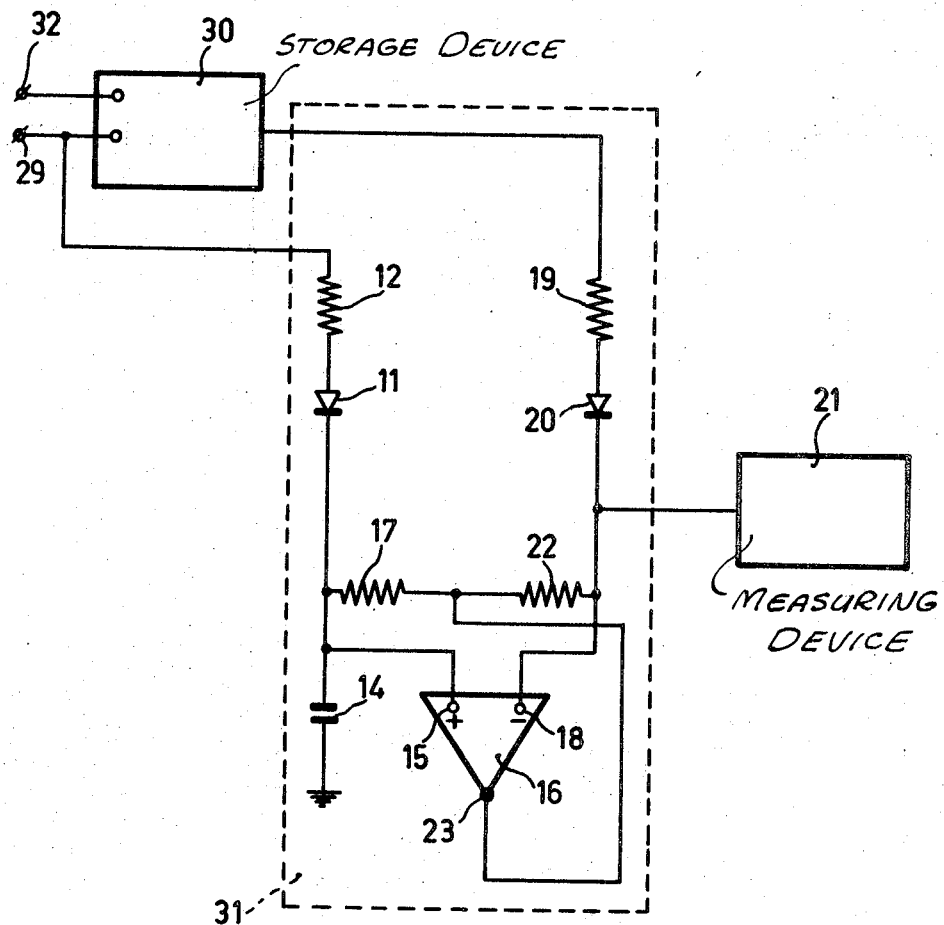

Embodiments of the invention will now be described, by way of example, with reference to the accompanying diagrammatic drawings, in which:

FIG. 1 shows schematically a device according to the invention in which a make switch is used, FIG. 2 shows an embodiment of a device according to the invention in which a break switch is used, FIG. 3 is a graph which illustrates the waveform of the voltage across the capacitor, FIG. 4 shows another embodiment of the device according to the invention using monostable multivibrators as switches, and FIG. 5 is a circuit diagram of an embodiment of the device according to the invention.

Referring now to FIG. 1, $S_1$ denotes a switch which is closed during the time interval to be measured. At the beginning of the measurement a capacitor 14 has a fixed reference potential, for example, the ground potential which is shown as a common reference line. One terminal of the switch $S_1$ is connected to the capacitor 14 and the other terminal is connected to one end of a resistor 12, the other end of which is connected to a voltage source 13. The capacitor 14 has one terminal connected to ground and its other terminal connected to an input 15 of an operational amplifier 16 and to a resistor 17. A second input 18 of the operational amplifier 16 is connected to the voltage source 13 via a resistor 19 and also to an output of the measuring means 21 of known type, and to one end of a resistor 22 the other end of which is connected to the resistor 17 and to an output 23 of the operational amplifier 16. The source 13 and a reference input of the measuring means 21 are also connected to ground.

During the interval in which $S_1$ is in the closed condition, the voltage across the capacitor 14 will rise according to a power of $e$ towards the potential of the source 13 with a time constant determined by the values of the resistor 12 and the capacitor 14. At the instant at which $S_1$ is opened, the voltage $V_{14}$ across the capacitor 14 has reached a value which lies between O and $V_{13}$, $V_{13}$ the voltage of the source 13. The discharge current which flows through the resistor 17, and which was negligible during the charging, will now discharge the capacitor. A current also flows from the source 13 to the output 23 of the operational amplifier 16 through the resistors 19 and 22. Owing to the properties of the operational amplifier the voltage at the input terminal 18 will follow the voltage at the input terminal 15. The following relationships always obtain: $V_{13} - V_{14} = IR_{19}$ and $IR_{22} = IR_{17}$, where I is the current flowing through the resistor 19 of value $R_{19}$ and resistor 22 of value $R_{22}$, and $i$ is the discharge current of the capacitor 14 of value $C_{14}$ through the resistor 17 of value $R_{17}$. Furthermore:

$$(dV_{14}/dt) = -(i/C_{14}) = -(I \cdot R_{22}/C_{14} \cdot R_{17}) = -(V_{13} - V_{14})/R_{19} \cdot (R_{22}/C_{14} \cdot R_{17})$$

Assuming the time constant of the combination of the resistors and the capacitor to be T and the initial voltage across the capacitor 14 to be $V_o$, then:

$$T(dV_{14}/dt) = +V_{14} - V_{13}$$

the solution being:

$$V_{14} = V_{13} - (V_{13} - V_o) \epsilon + (t/T)$$

Referring to the charge time of the capacitor 14, i.e. the time to be measured, as $t_1$, then:

$$V_o = V_{13} [1 - \epsilon - (t_1/R_{12}C_{14})]$$

When this is substituted in the preceding equation we have:

$$V_{14} = V_{13} [1 - \epsilon (t/T) - (t_1/R_{12}C_{14})]$$

The measuring means 21 of FIG. 1 may comprise a voltage comparator which compares the potential of the common reference line, which is shown as ground, with the potential of the input terminal 18. This comparator triggers the time measuring device, which is also included in the measuring means 21, when a positive voltage appears at the input 18 and hence across the capacitor 14, and stops this device when receiving a signal which indicates that the input terminal 18 has reached zero potential. The time measured is referred to as $t_2$ and may be substituted in the preceding equation, taking into account that $V_{14}$ has become zero. From this it follows that $$t_2/T = (t_1/R_{12} \cdot C_{14}) \text{ or}$$

$$t_1 = (R_{12} \cdot C_{14} \cdot R_{22}/R_{19} \cdot C_{14} \cdot R_{17}) t_2 \text{ or}$$

$$t_1 = (R_{22}/R_{17}) t_2, \text{ when } R_{12} = R_{19}$$

$R_{17}$ may be made many times, for example, ten thousand times, greater than $R_{22}$. Thus the interval $t_2$ measured is greater than the interval $t_1$ to be measured by the same factor.

In FIG. 2 corresponding circuit elements are designated by the same reference numerals. A switch $S_2$ is connected in parallel with the capacitor 14 and except during the time interval to be measured is always closed. A diode 11 is connected between the capacitor 14 and the junction of the switch $S_2$ and the resistor 12. To compensate for the voltage drop across the diode 11 a diode 20 must be connected in series with the resistor 19. In the device shown in FIG. 2 the switch $S_2$ may be a transistor, a flip-flop, a Schmitt trigger or a similar semiconductor circuit element.

FIG. 3 is a graph illustrating the charge curve 25 and the discharge curve 26 of the capacitor 14. The voltage V across the capacitor 14 is plotted as the ordinate and time $t$ as the abscissa. The period $t_1$ is the charge time of the capacitor 14 and $t_2$ its discharge time.

At a point 27 the gradient of the discharge curve 26 is $\alpha$. The dashed line $V_{13}$ is the supply voltage of the device. The discharge curve 26 is derived from the charge curve 25 by rotating this curve through 90° about a point 28 and stretching the curve according to the ratio between the values $R_{17}$ and $R_{22}$.

The gradient of the discharge curve 26 increases during the discharge of the capacitor 14. This gradient has the property of steadily increasing. On reaching zero voltage its value is equal to $\alpha$. Thus, the transition of the voltage across the capacitor 14 to a given voltage threshold in the vicinity of zero can accurately be determined. The gradient $\alpha$ can be calculated from one of the preceding formulae, with $V_{14} = 0$:

$$(dV_{14}/dt) = -V_{13} \cdot (1/T) = -V_{13} \cdot (t_1/t_2) \cdot (1/R_{12} \cdot C_{14})$$

When, for example, the maximum time $t_1$ to be measured is made thrice the RC time constant $R_{12} C_{14}$, near the zero point the gradient also will be thrice that found in the known system, using charge and discharge current sources and assuming that the ratio $t_1/t_2$ is equal and the capacitor can be charged to a maximum of $V_{13}$. In FIG. 3 the improvement will be seen by drawing a straight charge line from the zero point to the peak value, i.e. along the curve 25, and a straight discharge line from the peak value to the point 27 along the curve 26. The gradient $\alpha$ is greater and hence gives improved zero discrimination.

In FIG. 4 the parallel switch of FIG. 2 is replaced by an AND gate circuit which comprises diodes 6 and 7 connected in series with a resistor 5 to ground and a diode 9 connected to ground through a resistor 8. At the junction point of the diode 6 and the resistor 5 a monostable multivibrator 3 having a start input 1 is provided as a switch, and at the junction point of the diode 9 and the resistor 8 a monostable multivibrator 4 having a stop input 2 is provided.

Operation of the device is as follows: when the monostable multivibrator 3 detects the positive leading edge of a pulse (commencement of the measuring cycle) at its input 1 it becomes operative and delivers a signal having a width $\Delta t$. Similarly the monostable multivibrator 4 becomes operative when it detects the positive leading edge of a pulse (termination of the measuring cycle) at its input 2, whereupon it delivers a pulse the width of which is slightly greater than $\Delta t$. The time to be measured is the time interval $t'$ between the commencement pulse and the termination pulse. When the two monostable multivibrators 3 and 4 are not operative, the current traversing the resistor 12 flows away to ground through the diode 9 and the resistor 8 owing to the asymmetry of the circuit. When the monostable multivibrator 3 becomes operative the operation of the system remains the same. When both monostable multivibrators 3 and 4 are operative, the AND gate 24 opens and the capacitor 14 is charged through the resistor 12 and the diode 11. As soon as the monostable multivibrator 3 becomes inoperative again the AND gate 24 is closed and the capacitor 14 discharges.

Thus, the capacitor 14 has been charged during a time interval:

$$t_1 = \Delta t - t',$$

during which time interval the AND gate 24 was open. When the AND gate 24 closes the capacitor 14 discharges through the resistor 17 during a time interval $t_2$.

For some uses it may be of advantage to measure very short times by means of the described indirect method in which the time constant $\Delta t$ greatly influences the accuracy of the measuring results. It may be assumed that the monostable multivibrator 3 is capable of delivering a signal having a duration of 150 nanoseconds ±0.1, the prolongation factor may be $10^4$ and pulse durations between 0 and 150 nanoseconds may be measured with an accuracy of 0.25 nanosecond.

Since the value of the supply source 13 does not appear in the measuring results, in principle the supply source 13 may be replaced by the pulse source itself which may have a given variable amplitude.

FIG. 5 shows an embodiment in which this principle is applied. The amplitude limits of the pulse to be measured must not vary by too great a factor because otherwise the gradient may be adversely affected at the zero point. In this embodiment a storage device is required to store the pulse amplitude after the time $t_1$.

The device shown in FIG. 5 comprises a storage device 30 of a known type having an input 29, a reset-to-zero input 32, measuring means 21 and a device according to the invention 31.

In the device shown in this Figure elements which are designated by the same numerals as in FIG. 1 perform the same functions. The pulse source which delivers a pulse of known duration and variable amplitude is connected to the input 29 of the storage device 30. The storage device 30 is charged to a voltage which corresponds to the pulse amplitude, while the capacitor 14 is charged via the resistor 12. The device according to the invention then operates in exactly the same manner as described hereinbefore. On termination of the pulse discharge commences via the resistor 17. The input 18 of the operational amplifier 16 is fed via the diode 20 and the resistor 19 by the storage device 30 which during the entire discharge period maintains a voltage equal to the initial pulse amplitude. On termination of the measurement the storage device 30 is reset to zero to permit the succeeding measurement.

The possible uses of the device according to the invention are numerous and various. Particular instances are:
measuring the time between two pulses,
measuring the leading edges of pulses,
measuring the widths of pulses,
determining a passage through zero with a high degree of accuracy,
use in pulse code modulation,
use in radar.

What is claimed is:

1. A device for measuring a time interval comprising a capacitor, means for charging the capacitor during a first time interval which depends upon the time interval to be measured, means for discharging the capacitor during a second time interval which is related to the first time interval, and means for measuring the second time interval, said charging means including a first resistor and means for connecting said resistor to a voltage source during the first time interval, and the discharging means includes an operational amplifier having a first input terminal connected to the capacitor and a second input terminal connected via a second resistor to said voltage source, means connecting a third resistor between the amplifier output and said first input terminal and a fourth resistor between the amplifier output and said second input terminal of the operational amplifier in a manner such that the ratio between the first and second time intervals is proportional to the ratio between the resistance values of the fourth and third resistors, and wherein the means for measuring the second time interval includes a voltage comparator having one input connected to said second input terminal and the other input connected to a reference line to which the voltage source and the capacitor also are connected.

2. A measuring device as claimed in claim 1, characterized in that the ratio between the resistance values of the fourth and third resistors are chosen to be of the order of one to ten thousand.

3. A measuring device as claimed in claim 1 wherein said means for connecting the first resistor to said voltage source comprises a switch connected in series with the first resistor so as to pass current during the first time interval.

4. A measuring device as claimed in claim 1 further comprising a gate diode connected between the first resistor and the capacitor and a compensating diode connected between the second resistor and the amplifier second input terminal, and wherein said connecting means comprises a switch connected between the junction point of the first resistor and the gate diode and said reference line so as to pass current outside of the first time interval and to pass no current during this interval.

5. A measuring device as claimed in claim 1 for measuring the duration of a pulse delivered by a pulse source wherein the pulse source comprises said voltage source to which the first resistor is connected in series with a diode, a compensating diode connected in series with the second resistor, and a storage device coupled between the pulse source and the second resistor which stores and maintains the voltage amplitude of the pulse source, and a control input provided to reset the storage device to zero on termination of the time measurements.

6. A device for measuring time intervals comprising, a source of voltage, a capacitor, a first resistor connected to the capacitor as a part of a charge circuit therefor, means for selectively connecting said voltage source to said capacitor charge circuit to charge the capacitor during a first time interval determined by the time interval to be measured, an operational amplifier having first and second input terminals and an output terminal, means including said operational amplifier for discharging the capacitor during a second time interval that is substantially longer than said first time interval and is in a given ratio to the first time interval, a second resistor, means connecting the first input terminal of the amplifier to the capacitor and the second input terminal to said voltage source via said second resistor, third and fourth resistors, means connecting the third resistor between the amplifier output terminal and the first input terminal and the fourth resistor between said amplifier output terminal and said second input terminal, the resistance values of said third and fourth resistors being chosen in the same ratio as said given ratio between the second and first time intervals, and means for measuring the second time interval having an input terminal connected to the second input terminal of the amplifier.

7. A measuring device as claimed in claim 6 wherein said selective connecting means comprises a switching device connected in series with the capacitor charge circuit and arranged to pass current during the first time interval and to block the current during the second time interval.

8. A measuring device as claimed in claim 6 wherein said selective connecting means comprises a switching device connected in shunt with the capacitor and arranged to pass current during the second time interval and to block the current during the first time interval, a first diode connected in series with the capacitor in the charge circuit thereof, and a second diode connected in series with the second resistor and the amplifier second input terminal.

9. A measuring device as claimed in claim 8 wherein said switching device comprises, third and fourth diodes each connected in a shunt circuit with the capacitor, and first and second multivibrator circuits coupled to said third and fourth diodes to selectively control the conduction thereof to provide said first and second time intervals.

10. A measuring device as claimed in claim 6 wherein said measuring means includes a comparator having one input connected to the second input terminal of the amplifier and a second input connected to a voltage reference line to which the voltage source and the capacitor are also connected.

* * * * *